United States Patent [19]

Mahoney et al.

[11] Patent Number: 5,387,095

[45] Date of Patent: Feb. 7, 1995

[54] APPARATUS FOR INJECTION MOLDING HIGH-VISCOSITY MATERIALS

[75] Inventors: Timothy I. Mahoney, Ridgecrest, Calif.; Kirk E. Newman, Yorktown; James A. Gusack, Williamsburg, both of Va.; George J. Sallade, Springville, Ind.

[73] Assignee: The United States of America as represented by the Secretary of the Navy, Washington, D.C.

[21] Appl. No.: 43,706

[22] Filed: Apr. 7, 1993

[51] Int. Cl.$^6$ .............................................. B29C 45/06
[52] U.S. Cl. ................... 425/145; 425/150; 425/572; 425/576
[58] Field of Search ............... 425/145, 150, 557, 558, 425/572, 574, 575, 576

[56] References Cited

U.S. PATENT DOCUMENTS

| | | | |
|---|---|---|---|
| 2,476,219 | 7/1949 | Purinton | 425/544 |
| 2,479,383 | 8/1949 | MacMillin | 425/174.8 R |
| 2,864,216 | 12/1958 | Long et al. | 53/517 |
| 2,939,176 | 6/1960 | Adelman | 264/3.1 |
| 3,108,318 | 10/1963 | Miller et al. | 452/43 |
| 4,752,201 | 6/1988 | Kauffman et al. | 425/145 |
| 4,874,308 | 10/1989 | Atlas et al. | 425/544 |

OTHER PUBLICATIONS

Procurement Specifications for PBX Injection System, Jun. 1989.
List of Companies Jun. 8, 1993.
CBD Public Notification Sep. 23, 1991.
Copy of Announcement and Synopsis of Procurement Oct. 27, 1989.
Advertisement for an Explosive Injection Molding Machine, 1985.
Report Describing a Deaerator Loader, Lawrence Livermore National Laboratory Jun. 25, 1986.
Injection Molding Handbook, pp. 292–298, Van Nostrand Reinhold Company 1986.

*Primary Examiner*—Tim Heitbrink
*Attorney, Agent, or Firm*—William C. Townsend

[57] ABSTRACT

Apparatus for injection molding highly viscous materials in which incoming high-viscosity material flows through a supply conduit (24) and is divided into strands by splitter plates (58) as it flows into an evacuated chamber (52) and is degassed. When the chamber is full, the supply of high-viscosity material is interrupted and the chamber (52) is rotated to an injecting station while another chamber (54) swings to the degassing station for filling. At the injecting station, a piston (100) is lowered to engage the high-viscosity material in the first chamber (52), and a mold table is rotated to register a mold with a vacuum shroud (128') and the mold is lifted into the shroud. The piston (100) is further lowered in controlled increments to inject a quantity of high-viscosity material sufficient to fill a mold, then stop in place while the filled mold is removed and empty molds are sequentially inserted for filling. When the chamber has insufficient high-viscosity material remaining to fill another mold, the piston is retracted and the chamber (52) is rotated back to the degassing station while the filled chamber (54) swings to the injecting station for another cycle of loading additional molds. Flow passages for the high-viscosity material, which has a viscosity of at least about 8 kilopoise, have a minimum orifice diameter of at least about 0.5 inch. Flow stagnation and clogging of the high-viscosity material are avoided. Operations such as degassing and injecting can be separately controlled. High driving forces are avoided. Rapid, effective degassing, and enhanced production, are achieved.

11 Claims, 8 Drawing Sheets

APPARATUS FOR INJECTION MOLDING HIGH-VISCOSITY MATERIALS

BACKGROUND OF THE INVENTION

The art of injection molding has been developed primarily for low viscosity materials, i.e., materials having a viscosity of less than about 1 kilopoise. Traditional injection molding equipment and techniques are intended to accomodate thermoplastic materials which can be melted to yield low viscosities. A more recent approach called reaction injection molding is intended for thermosetting materials which have not been highly filled and also have low viscosities. It has been commonly understood that materials having a viscosity greater than about 8 kilopoise, including materials possessing a degree of fill greater than about 40% by weight, were unsatisfactory to process. Simply put, injection molding of high-viscosity materials has been limited by the unavailability of suitable equipment.

Accordingly, a main object of the invention is the provision of an improved apparatus for injection molding highly viscous materials.

Among the deficiencies of prior art equipment as applied to processing high-viscosity materials is the tendency for the flow of material to stagnate and/or clog in the flow channels of the processing apparatus. Another object of the invention is to overcome this deficiency of the prior art.

To make injection molded parts, several unit operations (e.g. mixing, degassing, injecting) are required and it is important to have control over each operation in order to consistently produce acceptable products. Prior art machines that perform two or more operations simultaneously on a given quantity of material do not permit the desired degree of control over all of the operations. It is another object of the invention to produce an apparatus for injection molding high-viscosity materials in which each unit operation is performed separately and therefore permits a high degree of control to be exercised over the parameters that affect the individual operations.

In injection molding of highly filled materials, use of excessive driving forces on the material produces shear stresses in the material that are so high that the filler separates from the binder and thereby produces binder-rich, defective products. This is a particular problem in machines where the injecting forces are applied in a direction normal to the resultant fluid flow. It is a further object of the invention to provide an injection molding apparatus which avoids necessity for application of excessive forces to the material being injected.

High-viscosity materials tend to entrap air during mixing and transport operations, and entrapped air must be minimized before the material is molded in order to ensure that the proper amount of material is dispensed and to avoid undesired air pockets in the molded products. Still a further object of the invention is to provide an injection loading apparatus having improved degassing capabilities.

Prior art equipment also suffered from the disadvantage of being low in production volume capacity. Yet a further object of the invention is the provision of an injection loader having improved productivity. Still other objects and advantages of the invention will appear from the following detailed description which, together with the accompanying drawings, discloses a preferred embodiment of the invention for purposes of illustration only. For definition of the scope of the invention, reference will be made to the appended claims.

Figure 1:
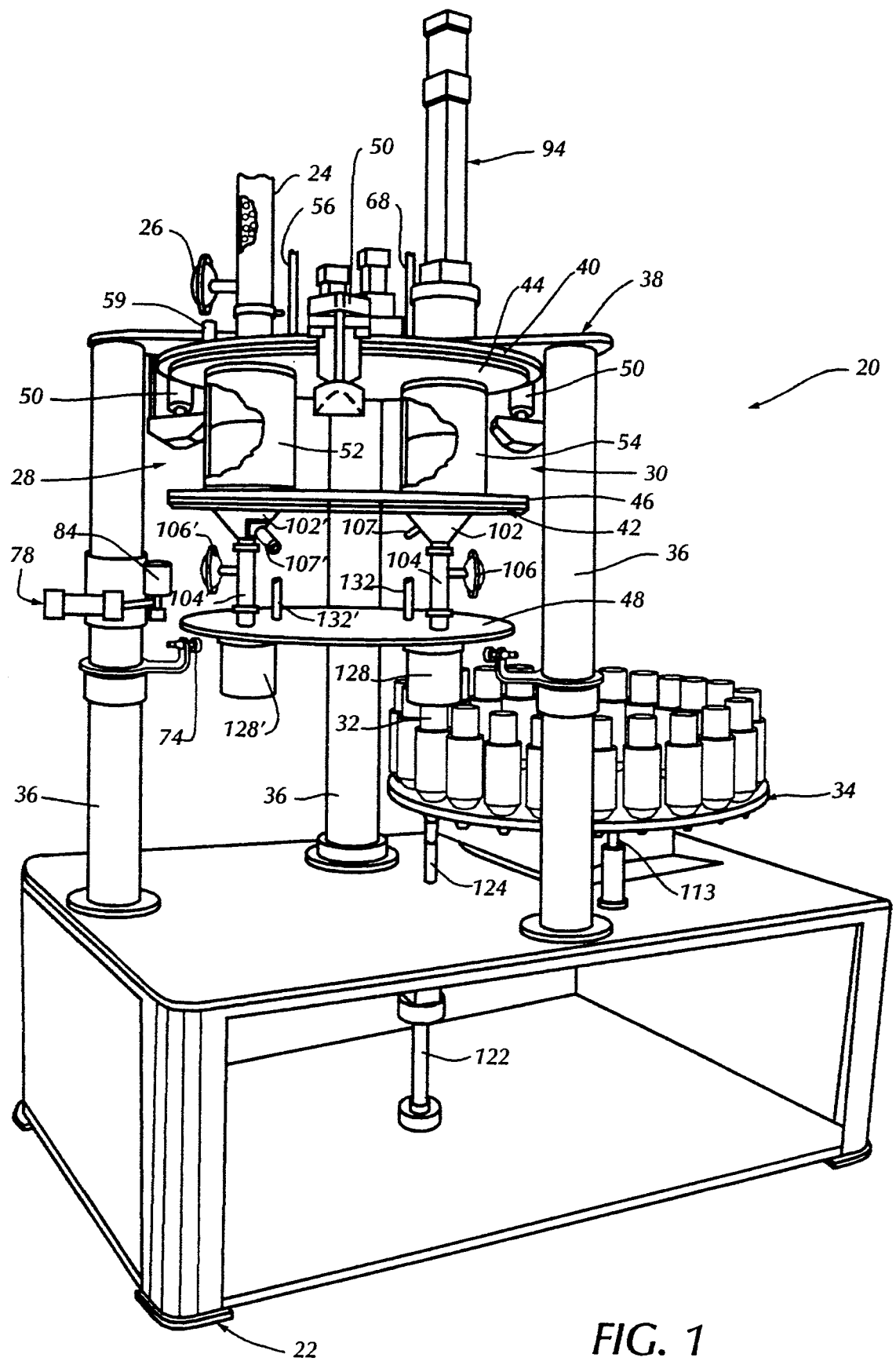
FIG. 1 diagramatically illustrates a high-viscosity material injection molding apparatus embodying principles of the invention.

Primed reference characters, where employed, designate elements similar to the elements denoted by the corresponding unprimed characters.

DETAILED DESCRIPTION OF THE PREFERRED EMBODIMENT

With reference to FIG. 1, an apparatus for injection molding high-viscosity materials according to the invention is generally indicated at 20 and comprises base 22 that carries the other components of the structure. A stream of high-viscosity material flows into the apparatus through supply passage or conduit 24 from an external source (not shown) that may be a conventional mixing or storage container and forms no part of the present invention. Flow of incoming material through conduit 24 is controlled by valve 26. In overview of the operation of machine 20, the incoming material will be degassed at degassing station 28, transported by rotational, swinging action to injecting station 30, and injected into one of a plurality of molds as 32 that are serially registered with the injecting station by rotation of mold carrier and indexing table 34. Operations are conducted under automatic control, and with the high-viscosity material maintained under vacuum conditions from the time it enters the degassing station until after it is cast, as will presently be described in detail.

Three columns 36, disposed in a triangular array, are upstanding from base 22 and joined at their top sections by a support assembly 38 comprising fixed plate member 40. A vertically movable, rotatable assembly or rotor 42 comprising an upper plate 44, medial plate 46, and lower plate 48 is arranged below and suspended from fixed plate 40 by three peripherally spaced-apart clamps 50. A first cylindrical chamber 52 and second cylindrical chamber 54 are carried by rotor 42 between the upper and medial plates and spaced 180° apart. First chamber 52 is shown positioned at degassing station 28 in FIG. 1, and second chamber 54 at injecting station 30.

Figure 2:
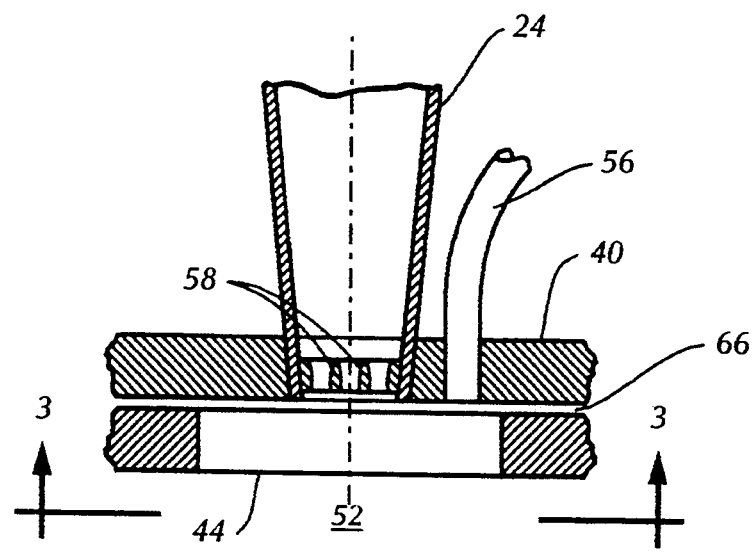
FIG. 2 shows details of the machine of FIG. 1 for splitting the flow of incoming material into a plurality of strands.
Figure 3:
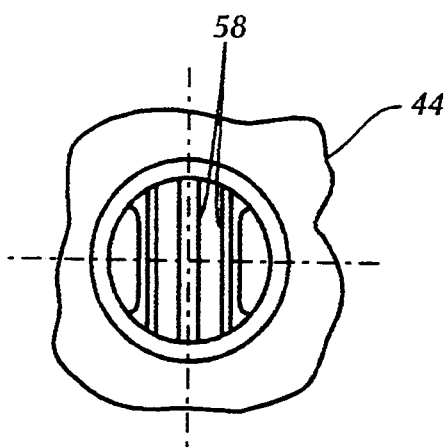
FIG. 3 is taken on line 3—3 of FIG. 2.

Vacuum conduit 56 from a conventional vacuum source (not shown) communicates with first chamber 52 (see also FIG. 2) and evacuates the chamber to effect degassing of the high-viscosity material entering the chamber through supply conduit 24. As shown in detail in FIGS. 2 and 3, a plurality of splitter plates 58 are provided at the outlet of supply conduit 24 for splitting the incoming high-viscosity material into strands as it flows into the chamber at the degassing station. By creating multiple strands, the diffusion distance that any entrained air must move to be released at a boundary surface of the high-viscosity material is minimized, for more effective degassing action. Fluid level sensor 59, which may be of any suitable type of conventional design (such as that available commercially as Model SMI912DSRQD from the Banner Engineering Corporation of Minneapolis, Minn.) monitors the level of material in chamber 52 to prevent overfilling.

Figure 4:
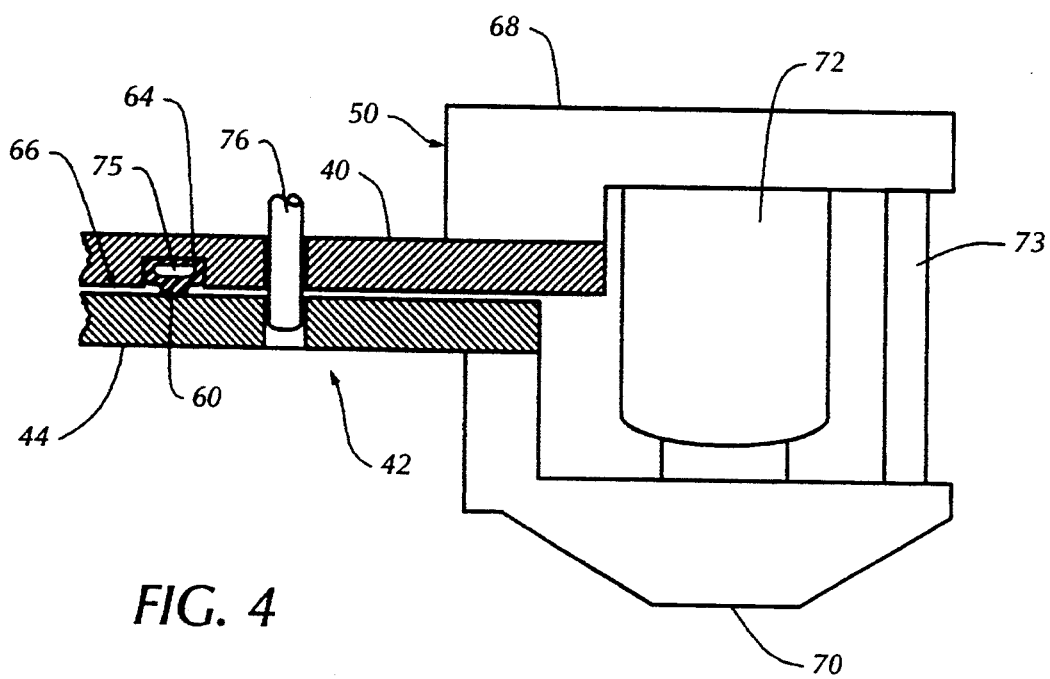
FIG. 4 depicts clamping details of the apparatus of FIG. 1.
Figure 5:
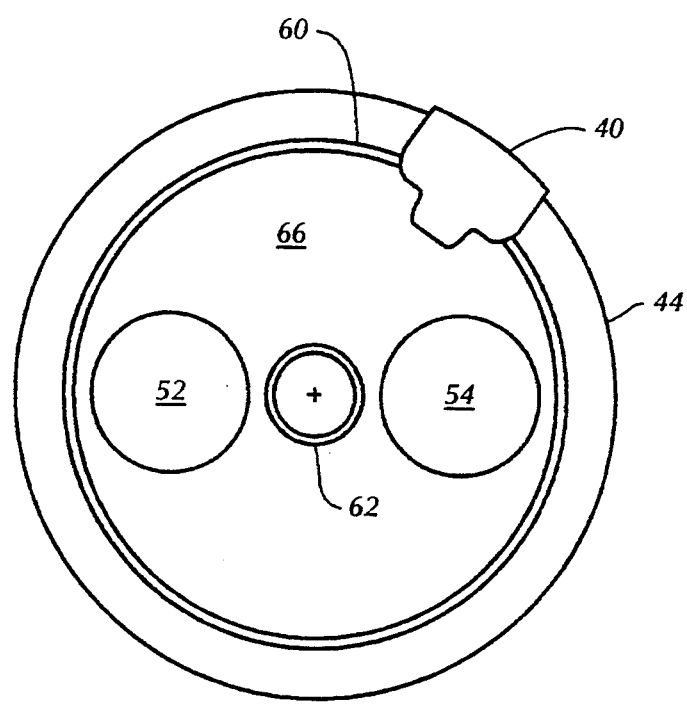
FIG. 5 shows sealing details.

As shown in FIGS. 4 and 5, a pair of radially spaced-apart, resilient, annular seal rings 60 and 62 are provided between fixed plate 40 and rotatable upper plate 44. Outer seal ring 60 in the illustrated embodiment is disposed in annular groove 64 in fixed plate 40, and sealingly engages that plate as well as upper plate 44. Inner seal ring 62 is similarly mounted, radially inwardly of seal 60, and the arrangement of the two seals creates a thin, toroidally shaped space 66 between plates 40 and 44 that is sealed from ambient. Vacuum conduit 56 (see also FIG. 3) and evacuated chamber 52 communicate with space 66 so that, when plate 44 rotates, seals 60 and 62 slide over the upper surface of the plate 44 to maintain evacuated conditions between plates 40 and 44 as well as in chamber 52. Second chamber 54 (FIG. 7) also communicates with evacuated interplate space 66 whereby the seals are also effective to maintain vacuum conditions in chamber 54 notwithstanding rotation of rotor 42 of which plate 44 forms a component. It will be understood that, in the drawings, the vertical dimension of space 66 between plates 40 and 44 is exaggerated for purposes of illustration. Second vacuum conduit 68 (FIGS. 1, 7), from the same source of vacuum as vacuum conduit 56, communicates with chamber 54 and space 66 when injector piston 100 is extended downwardly into chamber 54 as will be described, to aid in maintenance of vacuum conditions in space 66 and chambers 52, 54.

Clamps 50 are conventional, hydraulically actuated clamping devices and as best shown in FIG. 4 each comprises a fixed upper jaw 68 mounted on plate 40, a movable lower jaw 70, and a hydraulic cylinder 72 suspended from upper jaw 68 and carrying lower jaw 70. Clamp 50 is shown in closed position in FIG. 4, holding plate 44 upwardly and relatively tightly against plate 40. When it is desired to swing rotor 42 that carries the chambers around the vertical axis of the machine so that one chamber swings from the degassing station to the injecting station while the other chamber swings from the injecting station to the degassing station, cylinder 72 is actuated to extend downwardly to move lower jaw 70 downwardly along guide rod 73 so that plate 44 is released from tight engagement with plate 40. Rotor 42 is lowered by gravity, under the control of hydraulic cylinder 72, a short distance downwardly to rest on three peripherally spaced rollers 74 (FIG. 1), each of which is carried by a column 36. The distance of lowering of rotor 42 is small enough to maintain sealing engagement with seals 60 and 62. The seals are of a conventional inflatable type having a central annular core space as 75 in the resilient annulus of the seal. The seals are inflated by admission of pressurized gas through a supply tube (not shown), which expands the seals in a vertically downward direction and thereby assists in maintaining an airtight seal between fixed plate 40 and rotor 42 as the latter is lowered. After lower plate 48 of rotor 42 comes to rest on rollers 74, lower clamping jaw 70 continues downwardly out of engagement with plate 44. When indexing pin 76 (FIG. 4) is withdrawn from aligned apertures in plates 40, 44 by conventional hydraulic actuating means not shown, and when the mold registration and injector positioning are suitable as will be described, rotor 42 is free to rotate about its vertical axis on rollers 74.

Figure 6:
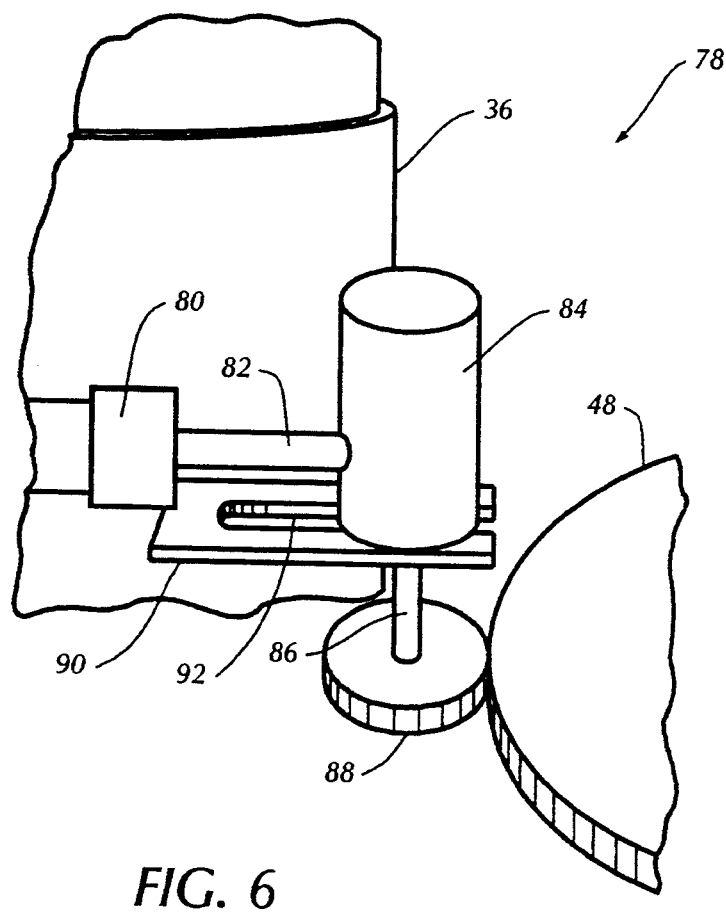
FIG. 6 illustrates rotation drive details.

Rotational action of rotor 42 is caused by hydraulic drive unit 78 (FIG. 1) that is carried by one of the columns 36. Drive unit 78 comprises a hydraulic ram 80 (FIG. 6) fixedly mounted on column 36 and having extensible piston rod 82. A rotary hydraulic motor 84 having drive shaft 86 is fixedly attached to rod 82. Friction drive wheel 88 is mounted on shaft 86. Motor 84 is carried by forked support 90 that is fixed on column 36, and drive shaft 86 rides back and forth in slot 92 in support 90 as piston rod 82 extends and retracts and thereby moves motor 84 back and forth along the slot. When rod 82 is extended as shown in FIG. 6, drive wheel 88 frictionally engages the periphery of lower plate 48 of the rotor so that rotation of the drive wheel causes plate 48 and thereby rotor 42 to rotate. When the rotor has been rotated 180° to position the two chambers at the respective desired stations, motor 84 is stopped, ram 80 retracted to withdraw the drive wheel from engagement with plate 48, and indexing pin 76 (FIG. 4) inserted in the aligned apertures in plates 40,44.

Figure 7:
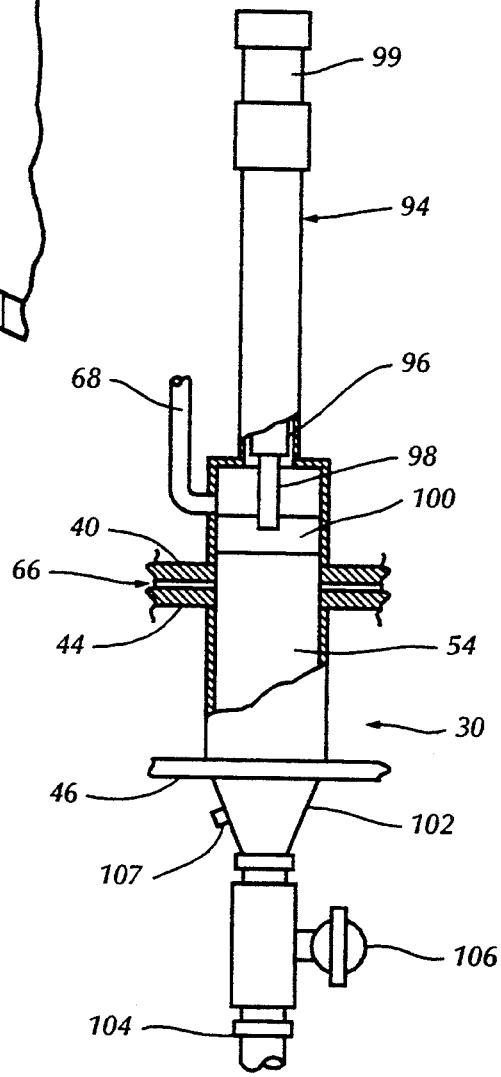
FIG. 7 shows details of the injector.

The injector by which high-viscosity material in the chamber at injecting station 30 is injected into molds is shown in FIGS. 1 and 7. The injector is generally indicated at 94, carried by support 38, and comprises a housing in which is disposed a hydraulic ram 96 having extensible and retractable rod 98 on which is mounted piston 100. The position of extension of rod 98 is sensed by a displacement sensor mounted at 99 on the ram housing. Sensor 99 can be of any conventional type, such as a Temposonics Model available from the MTS Systems Corporation of Cary, N.C. Piston 100 is shown in its position of maximum retraction in FIG. 7, in which position it is resident during rotation of the rotor. Extension of rod 98 after positioning of a chamber at the injecting station (chamber 54 in FIG. 7) advances piston 100 downwardly into the chamber to displace high-viscosity material in the chamber downwardly along the axis of movement of the piston and out of the chamber. Material displaced from the chamber flows into a passage having funnel-shaped entry portion 102 and comprising conduit 104 through which flow is controlled by valve 106. Pressure of the fluid material in the passage is detected by pressure sensor 107, which can be of any suitable, conventional type such as Model BL, 1000 PSI available commercially from the Data Instruments Company of Acton, Mass. Conduit 104, like supply conduit 24 and all other channels through which the high-viscosity material flows in the machine, should have a minimum orifice diameter of at least about 0.5 inch for processing materials having a viscosity of about 8 kilopoise and higher, to prevent stagnation and clogging of the flow channels. Conduit 104 directs the high-viscosity material into a mold registered with the injecting station in a manner that will now be described.

Figure 8:
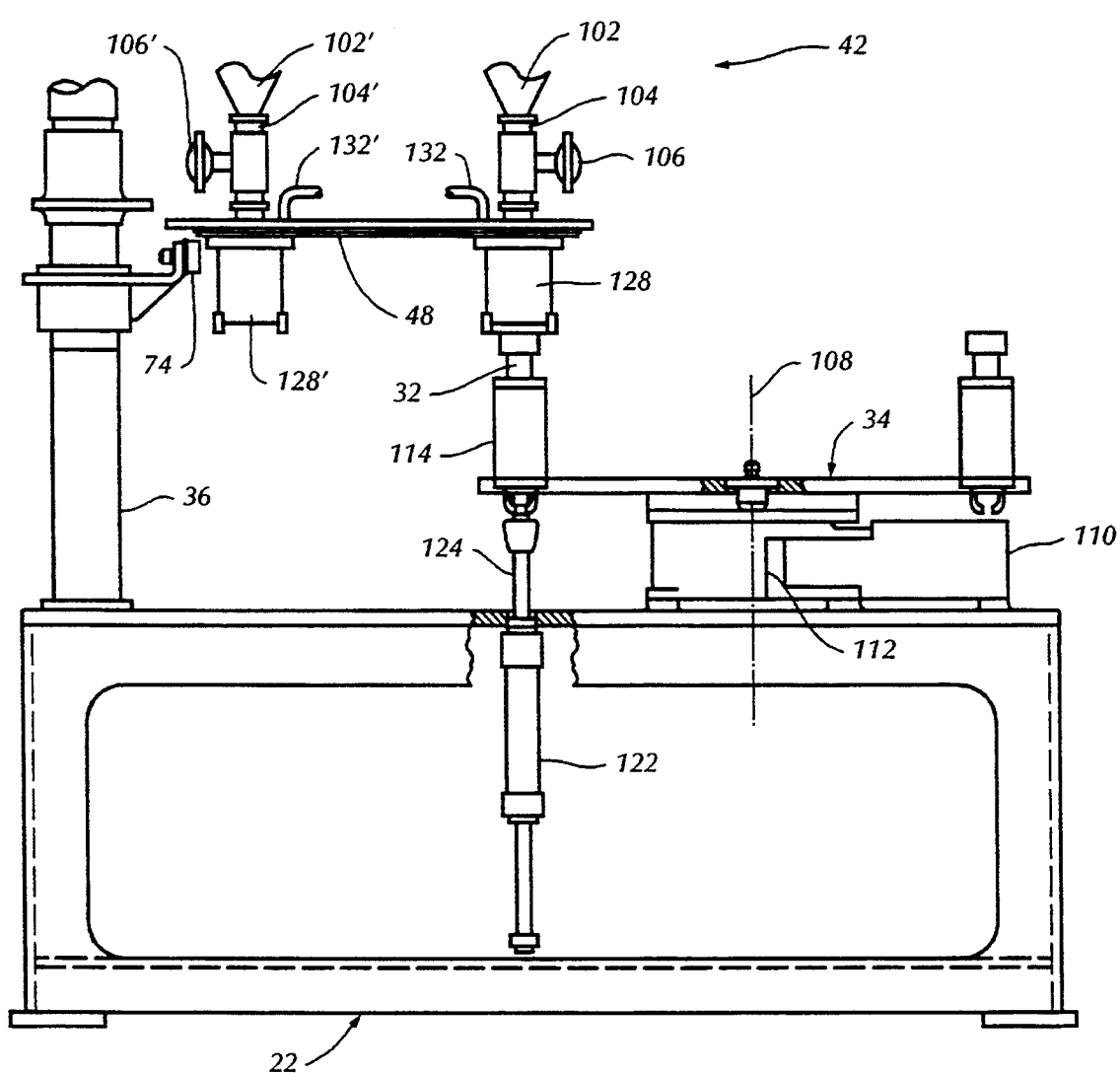
FIG. 8 is an elevational view showing the lower portion of the machine of FIG. 1, including the mold handling structure.
Figure 9:
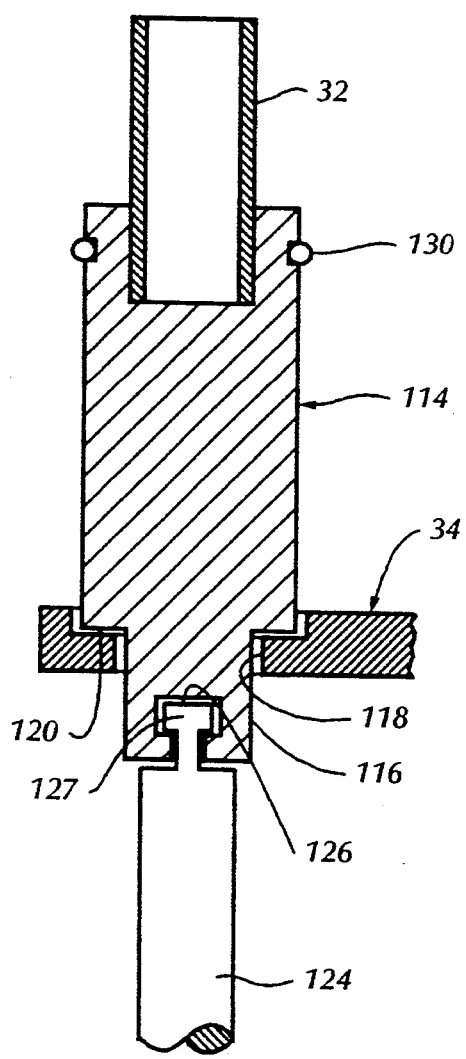
FIG. 9 schematically shows a mold prior to its insertion into a vacuum shroud.
Figure 10:
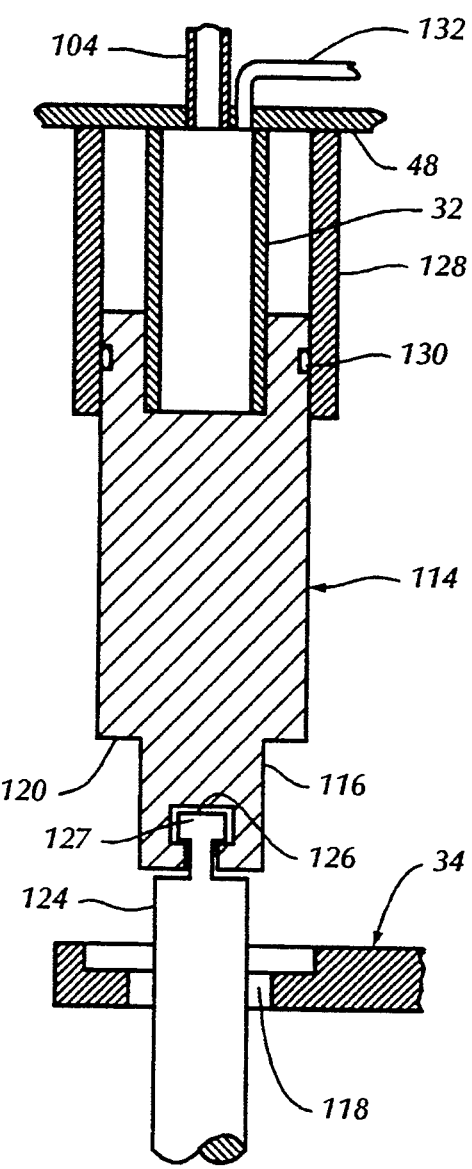
FIG. 10 shows the mold of FIG. 9 inserted into the shroud preparatory to receiving an injection of high-viscosity material.

Referring now to FIG. 8, mold indexing table 34 is spaced vertically below rotor 42 and carries a plurality of molds 32. Table 34 is driven in rotation about vertical axis 108 by motor 110 operating through a conventional stepper or positioner 112 that controls each rotational movement of the table to serially register each mold 32 with the injecting station. When a mold is thus registered, vertically extensible and retractable indexing pin 113 (FIG. 1) is hydraulically actuated to move upwardly into an aperture in table 34 to maintain the table in correct alignment. The pin is retracted downwardly out of the aperture when the table is to be again rotated to swing the next mold into registration with the injecting station. Each mold 32 is disposed in a mold carrier 114 (FIG. 8) that has a reduced-diameter lower portion 116 (see also FIGS. 9, 10) that is received in a circular aperture 118 formed in the periphery of indexing table 34. Mold carrier 114 has shoulder 120 that is adapted to seat on a mating shoulder in aperture 118.

Base 22 (FIG. 8) contains hydraulic ram 122 that has a vertically extensible and retractable rod 124 and is aligned with the injecting station. When a mold swings into registration with the injecting station, the position of extension of rod 124 vertically overlaps the lower end portion of the associated carrier 114 and tee-shaped recess 126 in the mold carrier laterally receives mating tee-shaped upper end portion 127 of rod 124 (see also FIG. 9). Put another way, tee-shaped end 127 enters recess 126 from the side as the mold swings into registry with the injecting station. Recess 126 is open on both opposing sides, so that further rotation of indexing table 34 causes tee end 127 of rod 124 to swingingly exit from recess 126 on the side opposite from which it entered. Regardless of that, when tee end 127 of rod 124 is in the recess 126 of a mold registered with the injecting station, further extension of rod 124 in an upward direction (FIG. 10) lifts the carrier from indexing table 34 and inserts it into vacuum shroud 128 that depends from plate 48 at the injecting station. Each mold carrier 114 has an annular seal or O-ring 130 that engages the interior walls of the vacuum shroud to seal the interior of the shroud from ambient when a mold and carrier are inserted into the shroud.

Vacuum conduit 132 from the same vacuum source as aforementioned communicates with the interior of shroud 128 for evacuating mold 32 after it has been inserted into the shroud and sealing has been effected by O-ring 130. Conduit 104 also communicates with the interior of shroud 128 for flow of high-viscosity material from the chamber at the injecting station into the mold in the shroud.

Advancement of piston 100 is controlled to inject a quantity of high-viscosity material sufficient to fill one mold, then stop in place in the chamber while the filled mold is removed and a new, empty mold is inserted in its place and evacuated. This will appear more fully from FIG. 11, with reference to which the cycle of operation of the injector will now be discussed.

Figure 11:
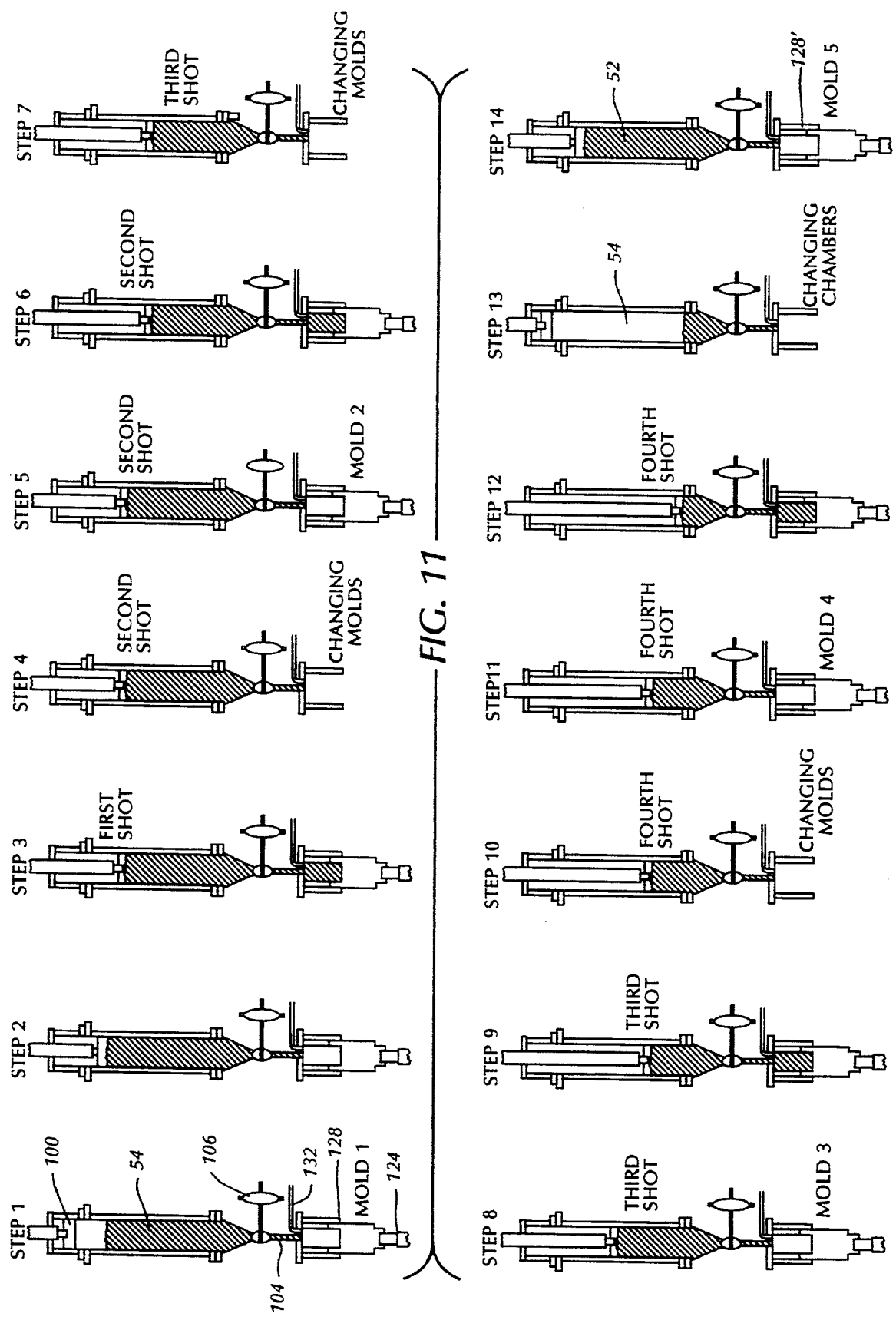
FIG. 11 schematically shows the operation of the injector.

In Step 1 of FIG. 11, piston 100 is shown fully retracted, the position that it holds when chamber 54, full of high-viscosity material, is rotated to the injecting station. The first mold is shown inserted in vacuum shroud 128, and is evacuated. Valve 106 is then opened to establish open communication between the mold and chamber 54 through conduit 104. Injector piston 100 is then lowered (Step 2 of FIG. 11) to engage the surface of the material in chamber 54, establishing the baseline position for the piston. The injector is then further advanced (Step 3) by extension of its hydraulic ram a predetermined distance from the baseline as sensed by the aforementioned displacement sensor and the distance of displacement is sufficient to inject a quantity of material sufficient to fill the mold in the shroud. It is important to note that the direction of resultant flow of the material from the chamber into the mold is along the axis of movement of the displacing piston, which minimizes the amount of driving force that the piston must apply to move the material. The arrangement by which the resultant flow is downwardly further reduces the needed driving force by the aid of gravity.

When the mold is filled, the piston is stopped in place in the chamber, valve 106 is closed to interrupt communication between the mold and the chamber, and the mold is then lowered out of the shroud by retraction of rod 124 (Step 4). Indexing pin 113 (FIG. 1) is retracted downwardly and mold carrier table 34 is rotated clockwise to swing the filled mold out of registration with the injecting station while swinging the next mold in the series around the table into such registration. The indexing pin is then extended to lock the table in place, rod 124 is extended to elevate the next mold (Step 5 in FIG. 11) into the shroud where it is then evacuated like the first mold through vacuum conduit 132. Valve 106 is reopened and piston 100 further advanced (Step 6) downwardly in the chamber a predetermined distance to inject a quantity of material that is just sufficient to fill the mold. The piston is then stopped in place in the chamber, valve 106 is closed, rod 124 retracted and the second mold is lowered out of the shroud (Step 7). The mold carrier table is operated to swing the third mold in the series into registration with the injecting station as previously described and the mold is elevated into the shroud (Step 8) for evacuation like the previous two molds. Valve 106 is then opened and piston 100 still further advanced (Step 9) a distance sufficient to displace a quantity of material sufficient to fill the third mold, then stopped in place. Valve 106 is closed, rod 124 lowered (Step 10), and the mold handling mechanism operated as aforesaid to insert a fourth mold (Step 11) into the shroud for evacuation. Valve 106 is opened and piston 100 advanced a further distance (Step 12) sufficient to displace another aliquot of material sufficient to fill a mold. Valve 106 is then closed and the mold lowered out of the shroud as previously described.

Now, however, the position of piston 100 as detected by the displacement sensor is such that there is insufficient material remaining in the chamber to fill another mold. When this condition exists, the piston is retracted upwardly out of the chamber to its original position (Step 13) to allow rotation of rotor 42 to swing empty chamber 54 from the injecting station to the degassing station while swinging chamber 52, which was being filled at the degassing station while injecting was being accomplished from chamber 54, to the injecting station (Step 14). The next mold is elevated into shroud 128' for repetition of the cycle described beginning with Step 1.

Figure 12:
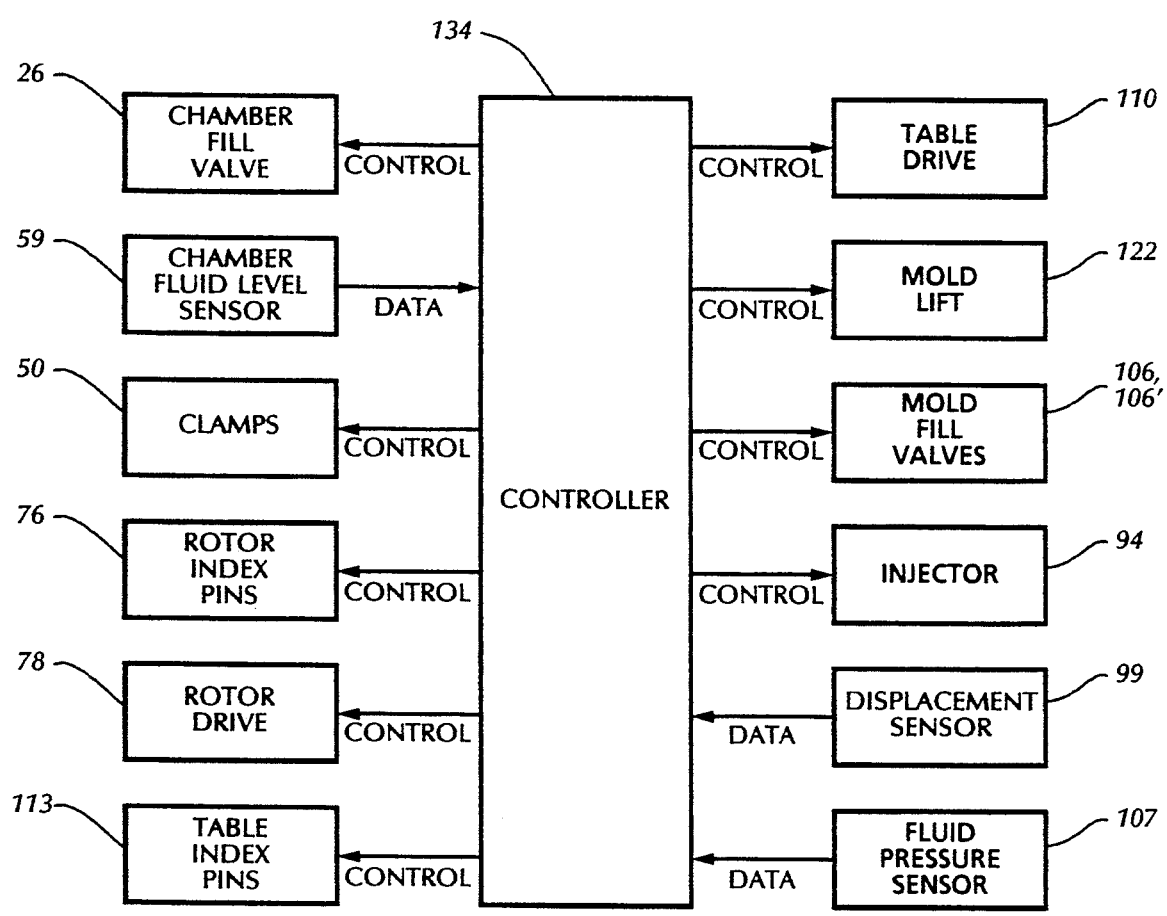
FIG. 12 is a block diagram schematically illustrating the control arrangement of the machine of FIG. 1.

With reference to FIG. 12, which has been simplified for purposes of illustration, data in the form of fluid level in the degassing station, position of displacement of the injector, and pressure of material in the passage from the chamber at the injecting station are provided to automatic process controller 134, which in return provides control signals to the components of the machine. The controller responds to signals from the sensors to adjust operating parameters as determined by the controller to be appropriate to maintain desired setpoint conditions, and actuate machine components including degassing chamber fill valve 26, clamps 50, rotor index pins 76, and rotor drive 78 at the proper times to effect coordinated filling of the chamber at the degassing station and its rotation to the injecting station. The controller also coordinates and effects appropriate actuation of mold table drive 110, mold lift 122, mold fill valves 106, 106', and the various stages of positioning of injector 94. The foregoing data acquisition and control functions may be accomplished in any suitable, conventional way. The controller, for example, may comprise a programmable logic controller (such as Model 545 of Texas Instruments, Inc. of Johnson City, Tenn.), driven by a personal computer (such as Model Z248 of the Zenith Data Systems Corporation of St. Joseph, Mich.) suitably programmed by commercially available data acquisition and control software (such as Model "Genesis" of Iconics, Inc. of Foxboro, Mass.). However, it will be understood that any hardware and software suitable for carrying out the purposes described above in connection with FIGS. 1, 8 and 11 and elsewhere herein may be utilized without departing from the principles of the invention.

A summary of operation of the machine is as follows: High-viscosity material, for example plastic-bonded explosive simulant having a 90% degree of fill and consisting essentially of about 90 weight per cent glass beads and the balance polyurethante binder, and having a viscosity of about 8 kilopoise, flows through supply conduit 24 (FIG. 1) and is divided into plural strands by splitter plates 58 (FIG. 2) as it flows into evacuated chamber 52 and is degassed. When the chamber is full to capacity as detected by fluid level sensor 59, valve 26 is closed to interrupt the flow of fluid material into the chamber. Indexing pin 76 (FIG. 4) is withdrawn and clamps 50 are extended to lower rotor 42 onto rollers 74. Ram 80 (FIG. 6) is extended to engage drive wheel 88 with lower plate 48 of the rotor. Motor 84 is actuated to rotate rotor 42 in a clockwise direction 180° to swing chamber 52 from the degassing station to the injecting station while swinging the other chamber from the injecting station to the degassing station for filling in the manner previously described in connection with FIG. 11. It is parenthetically noted that, when chamber 52 is later returned empty to the degassing station, it is by counter-clockwise rotation of the rotor). Irrespective of that, upon arrival of chamber 52 at the injecting station, indexing pin 76 is lowered into the aligned apertures in plates 40, 44 and clamps 50 are retracted to raise plate 44 off the rollers and tightly engage plate 40. Piston 100 is lowered to engage the surface of material in the chamber and establish its baseline position.

Meanwhile, mold table indexing pin 113 (FIG. 1) is retracted and the table is rotated to register a mold with vacuum shroud 128' that is underneath the chamber. Rod 124 is extended upwardly to and lift the registered mold into the shroud, where it is sealed by O-ring 130 and evacuated. Valve 106' is opened and a mold-filling cycle like that described above in connection with FIG. 11 is carried out. When the chamber has insufficient high-viscosity material remaining to fill another mold as detected by displacement sensor 99, injector piston 100 is retracted upwardly out of the chamber, rotor indexing pin 76 is retracted and the rotor rotation sequence just described is repeated except that the rotation is now counterclockwise and empty chamber 52 swings to the degassing station for reloading while filled chamber 54 swings to the injecting station for another cycle of loading further molds.

The inventive apparatus is applicable to the injection molding of diverse formulations of high-viscosity materials. It has particular utility in the processing of highly filled polymers, especially those incorporating one or more solid particulate materials dispersed in a thermosetting, elastomeric binder. With such products, the degree of fill may be as high as about 70% to 90% particulate solids by weight. The balance may be essentially liquid, such as a reacting, oligomeric liquid as the binder constituents begin to react with one another in the process of curing which will be completed in the molds. Plastic-bonded explosives are one group of high-viscosity materials to which the invention is applicable, but others such as food products can also be beneficially processed.

Apparatus according to the invention are highly advantageous. The deficiencies of prior art machines in flow stagnation and clogging are overcome. Major unit operations such as mixing, degassing and injecting are performed separately so that the process parameters for each operation can be controlled at optimum levels for that operation. Use of excessive driving forces on the material is avoided by applying the injecting forces in the direction of resultant flow so that the filler does not separate from the matrix. Moreover, the requirement for low driving forces translates into low mechanical energy input, which saves utility costs and time and is safer for injection molding of energetic materials. Rapid and effective degassing is accomplished by splitting the incoming material into multiple strands and by maintaining the material under vacuum conditions from the time it enters the machine until it is cast into molds. Increased production capacity is provided by having plural chambers with one always off-line being recharged while the other is actively casting into molds. Production capacity is further enhanced by filling multiple molds through incremental displacement of the injector in each injection cycle.

Although the invention has been described in connection with a preferred embodiment, such is not to be taken as limiting the principles of the invention as defined by the appended claims.

We claim:

1. Apparatus for injection molding high-viscosity materials, comprising means defining a degassing station, means defining a first chamber positioned at the degassing station, means for supplying high-viscosity material to the first chamber at the degassing station, means for evacuating the first chamber to degas the high-viscosity material supplied to the first chamber, means defining an injecting station displaced from the degassing station, means defining a second chamber displaced from the degassing station, means for moving the first chamber from the degassing station to the injecting station while moving the second chamber to the degassing station, a plurality of molds, means for registering a first mold with the injecting station, means for evacuating the first mold, means for establishing open communication between the first mold and the first chamber, means for injecting the high-viscosity material from the first chamber into the first mold, means for controlling the high-viscosity material injected at a quantity sufficient to fill the first mold and for stopping the injecting means when the first mold is filled, means for closing the open communication between the first mold and the first chamber, means for moving the first mold out of registration with the injecting station and for serially moving additional molds of the plurality of molds into registration with the injecting station for evacuation and filling like the first mold, means for detecting an insufficient quantity of said material to fill another mold remaining in the first chamber at the conclusion of filling of a mold, and means responsive to the detecting means for moving the first chamber away from the injecting station while moving the second chamber from the degassing station to the injecting station for filling said additional molds of the plurality of molds.

2. The apparatus of claim 1, in which the supply means includes first passage means for supplying said high-viscosity material, said high-viscosity-material having a viscosity of at least about 8 kilopoise, the communicating means includes second passage means, and the first and second passage means have a minimum orifice diameter of at least about 0.5 inch.

3. The apparatus of claim 1, in which the injecting means includes displacing means advancing into the first chamber in an axial direction for displacing said material in that direction into the first mold, and the control means includes means for stopping the displacing means in place in the first chamber when the first mold is filled, and means for further advancing the displacing means to inject a quantity of said material sufficient to fill each of the additional molds and stop the displacing means in place when each mold is filled, and including means responsive to the detecting means for withdrawing the displacing means from the first chamber when there is insufficient material remaining in the first chamber to fill another mold.

4. The apparatus of claim 1, in which the means for moving the chambers includes first rotating means for swinging the first chamber from the degassing station to the injecting station while swinging the second chamber to the degassing station and for swinging the first chamber away from the injecting station while swinging the second chamber to the injecting station, and the means for moving the molds includes second rotating means for serially swinging the molds into and out of registration with the injecting station.

5. Apparatus for injection molding high-viscosity materials, comprising means defining a degassing station, means defining a first chamber positioned at the degassing station, means including first passage means for supplying said high-viscosity material having a viscosity of at least about 8 kilopoise to the first chamber at the degassing station, evacuating means including means for evacuating the first chamber, to degas the high-viscosity material supplied to the first chamber, means defining an injecting station displaced from the degassing station, means defining a second chamber displaced from the degassing station, rotating means for swinging the first chamber from the degassing station to the injecting station while swinging the second chamber to the degassing station, a plurality of molds, means for registering a first mold with the injecting station, means for evacuating the first mold, communicating means including second passage means for establishing open communication between the first mold and the first chamber, means for injecting the high-viscosity material from the first chamber into the first mold, the injecting means including displacing means advancing into the first chamber in an axial direction for displacing material in that direction through the second passage means into the first mold, control means including means for controlling the advancement of the displacing means to inject a quantity of said material sufficient to fill the first mold and stopping the displacing means in place in the first chamber when the first mold is filled, means for closing the second passage means to interrupt the open communication between the first mold and the first chamber, means for moving the first mold out of registration with the injecting station and for serially moving additional molds of the plurality of molds into registration with the injecting station for evacuation and filling like the first mold, the control means being operative to further advance the displacing means to inject a quantity of material sufficient to fill each mold and stop the displacing means in place when each mold is filled, means for detecting insufficient material to fill another mold remaining in the first chamber at the conclusion of filling of a mold, and means responsive to the detecting means for withdrawing the displacing means from the first chamber, the rotating means including means for swinging the first chamber away from the injecting station while swinging the second chamber from the degassing station to the injecting station for filling said additional molds of the plurality of molds.

6. The apparatus of claim 5, in which the first and second passage means have a minimum orifice diameter of at least about 0.5 inch.

7. The apparatus of claim 5, in which the rotating means swings the second chamber from the injecting station to the degassing station while swinging the first chamber from the degassing station to the injecting station, and the rotating means swings the first chamber from the injecting station back to the degassing station while swinging the second chamber from the degassing station to the injecting station.

8. The apparatus of claim 5, in which the means for moving the molds includes second rotating means for serially swinging the molds into and out of registration with the injecting station.

9. The apparatus of claim 5, including
means for splitting the high-viscosity material supplied by the first passage means to the first chamber into a plurality of strands.

10. The apparatus of claim 5, in which
the evacuating means includes means for evacuating the second chamber.

11. Apparatus for injection molding high-viscosity materials, comprising
a base,
a fixed plate member carried by the base,
a vertically movable, first rotatable member carried by the base below the fixed plate member,
means defining a degassing station below the fixed plate member,
means defining a first chamber carried by the first rotatable member and positioned at the degassing station,
means including first passage means for supplying material having a viscosity of at least about 8 kilopoise to the first chamber at the degassing station,
evacuating means including means for evacuating the first chamber to degas the high-viscosity material supplied to the first chamber,
means defining an injecting station below the fixed plate member,
means defining a second chamber carried by the first rotatable member and positioned at the injecting station,
the evacuating means including means for evacuating the second chamber,
seal means engaging the fixed plate member and the first rotatable member for sealing the first and second chambers,
first rotating means for rotating the first rotatable member to swing the first chamber from the degassing station to the injecting station while swinging the second chamber from the injecting station to the degassing station and while maintaining the seal means in engagement with the fixed plate member and the first rotatable member,
a second rotatable member spaced vertically below the first rotatable member,
a plurality of molds carried by the second rotatable member,
second rotating means for rotating the second rotatable member to register a first mold with the injecting station,
means for evacuating the first mold,
means including second passage means for establishing open communication between the first mold and the first chamber,
the first and second passage means having a minimum orifice diameter of at least about 0.5 inch,
means for injecting the high-viscosity material from the first chamber into the first mold,
the injecting means including displacing means advancing downwardly into the first chamber in an axial direction for displacing said material in that direction through the second passage means into the first mold,
control means including means for controlling the advancement of the displacing means to inject a quantity of said material sufficient to fill the first mold and stopping the displacing means in place in the first chamber when the first mold is filled,
means for closing the second passage means to interrupt the open communication between the first mold and the first chamber,
the second rotating means being operative to rotate the second rotatable member to swing the first mold out of registration with the injecting station and for serially swinging further molds into registration with the injecting station for evacuation and filling like the first mold,
the control means being operative to further advance the displacing means to inject a quantity of said material sufficient to fill each mold and stop the displacing means in place when each mold is filled,
the control means including means for detecting an insufficient quantity of said material to fill another mold remaining in the first chamber at the conclusion of filling of a mold, and
means responsive to the detecting means for withdrawing the displacing means upwardly from the first chamber,
the first rotating means being operative to rotate the first rotatable member to swing the first chamber from the injecting station back to the degassing station while swinging the second chamber from the degassing station back to the injecting station for filling still further of the plurality of molds and while maintaining the seal means in engagement with the fixed plate member and the first rotatable member.

* * * * *